United States Patent
Baldwin et al.

(10) Patent No.: US 9,268,497 B2
(45) Date of Patent: *Feb. 23, 2016

(54) INCREASED IN-LINE DEDUPLICATION EFFICIENCY

(71) Applicant: INTERNATIONAL BUSINESS MACHINES CORPORATION, Armonk, NY (US)

(72) Inventors: Duane M. Baldwin, Rochester, MN (US); Nilesh P. Bhosale, Pune (IN); John T. Olson, Tucson, AZ (US); Sandeep R. Patil, Somers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/190,492

(22) Filed: Feb. 26, 2014

(65) Prior Publication Data

US 2014/0181465 A1 Jun. 26, 2014

Related U.S. Application Data

(63) Continuation of application No. 13/440,659, filed on Apr. 5, 2012, now Pat. No. 8,688,652.

(51) Int. Cl.
*G06F 17/30* (2006.01)
*G06F 3/06* (2006.01)

(52) U.S. Cl.
CPC ............ *G06F 3/0641* (2013.01); *G06F 3/0604* (2013.01); *G06F 3/0683* (2013.01); *G06F 17/30159* (2013.01)

(58) Field of Classification Search
USPC .......................................................... 707/692
See application file for complete search history.

(56) References Cited

U.S. PATENT DOCUMENTS

| | | | |
|---|---|---|---|
| 7,814,074 B2 * | 10/2010 | Anglin et al. .................. | 707/692 |
| 8,074,049 B2 | 12/2011 | Gelson et al. | |
| 8,108,353 B2 * | 1/2012 | Balachandran et al. ...... | 707/664 |
| 8,244,691 B1 | 8/2012 | Ramarao | |
| 8,639,669 B1 * | 1/2014 | Douglis et al. ................ | 707/692 |
| 8,667,032 B1 * | 3/2014 | Shilane et al. ................ | 707/825 |
| 2009/0171888 A1 * | 7/2009 | Anglin .............................. | 707/2 |
| 2009/0271454 A1 | 10/2009 | Anglin et al. | |
| 2009/0300321 A1 * | 12/2009 | Balachandran et al. ...... | 711/216 |

(Continued)

FOREIGN PATENT DOCUMENTS

| CN | 101276366 A | 10/2008 |
|---|---|---|
| CN | 101963982 A | 2/2011 |

(Continued)

*Primary Examiner* — Cam-Linh Nguyen
(74) *Attorney, Agent, or Firm* — Griffiths & Seaton PLLC (57) ABSTRACT

Exemplary embodiments for increased in-line deduplication efficiency in a computing environment are provided. Embodiments include incrementing the size of data samples from fixed size data chunks for each nth iteration for reaching a full size of an object requested for in-line deduplication, calculating in nth iterations hash values on data samples from fixed size data chunks extracted from the object, and matching in a nth hash index table the calculated nth iteration hash values for the data samples from the fixed size data chunks with a corresponding hash value of existing objects in storage, wherein the nth hash index table is built for each nth iteration of the data samples belonging to the fixed data chunks.

15 Claims, 5 Drawing Sheets

(56) References Cited

U.S. PATENT DOCUMENTS

| | | | |
|---|---|---|---|
| 2010/0094817 A1* | 4/2010 | Ben-Shaul et al. | 707/697 |
| 2010/0123607 A1* | 5/2010 | He et al. | 341/51 |
| 2010/0188273 A1* | 7/2010 | He et al. | 341/87 |
| 2010/0235332 A1* | 9/2010 | Haustein et al. | 707/692 |
| 2010/0250501 A1 | 9/2010 | Mandagere et al. | |
| 2011/0185149 A1 | 7/2011 | Gruhl et al. | |
| 2011/0218972 A1 | 9/2011 | Tofano | |
| 2011/0246741 A1 | 10/2011 | Raymond et al. | |
| 2011/0276780 A1 | 11/2011 | Sengupta et al. | |
| 2011/0276781 A1 | 11/2011 | Sengupta et al. | |
| 2012/0016845 A1 | 1/2012 | Bates | |
| 2012/0124105 A1 | 5/2012 | Provenzano | |
| 2012/0150869 A1 | 6/2012 | Wang et al. | |
| 2012/0166401 A1 | 6/2012 | Li et al. | |
| 2012/0166448 A1 | 6/2012 | Li et al. | |
| 2012/0191672 A1 | 7/2012 | Jayaraman | |
| 2012/0233135 A1 | 9/2012 | Tofano | |
| 2013/0013880 A1* | 1/2013 | Tashiro et al. | 711/170 |
| 2013/0018853 A1 | 1/2013 | Jayaraman et al. | |
| 2013/0018855 A1* | 1/2013 | Eshghi et al. | 707/692 |
| 2013/0060739 A1* | 3/2013 | Kalach et al. | 707/692 |
| 2013/0080404 A1* | 3/2013 | Smith et al. | 707/692 |
| 2013/0080406 A1 | 3/2013 | LaRiviere et al. | |
| 2013/0151803 A1 | 6/2013 | Tofano | |
| 2014/0344229 A1* | 11/2014 | Lillibridge et al. | 707/692 |

FOREIGN PATENT DOCUMENTS

| | | |
|---|---|---|
| CN | 102378973 A | 3/2012 |
| GB | 2477607 A | 10/2011 |

* cited by examiner

INCREASED IN-LINE DEDUPLICATION EFFICIENCY

PRIORITY CLAIM

This application is a Continuation of U.S. patent application Ser. No. 13/440,659 filed on Apr. 5, 2012.

BACKGROUND OF THE INVENTION

1. Field of the Invention

The present invention relates in general computing systems, and more particularly to increased in-line deduplication efficiency.

2. Description of the Related Art

In today's society, computer systems are commonplace. Computer systems may be found in the workplace, at home, or at school. Computer systems may include data storage systems, or disk storage systems, to process and store data. One such process is data deduplication. Data deduplication refers to the reduction and/or elimination of redundant data. In a data deduplication process, duplicate copies of data are reduced or eliminated, leaving a minimal amount of redundant copies, or a single copy of the data, respectively. Using deduplication processes provides a variety of benefits, such as reduction of required storage capacity and reduced need for network bandwidth. Due to these and other benefits, deduplication has emerged in recent years as a highly important technological field in computing storage systems.

SUMMARY OF THE INVENTION

With the emergence of storage cloud services, where users can own, create, modify, and/or delete containers and objects on a storage space within the storage cloud services, online access to the storage space over HTTP has significantly increased. The users of such storage cloud services typically perform these operations on cloud storage spaces they own with the help of application programming interfaces (API's), exposed by the storage cloud service providers. Although exposing the API's to users has been quite useful, the use of API's for performing operations on cloud storage services has opened up additional issues for the service providers in the area of data de-duplication. Accordingly, a need exists for the storage cloud service providers to reduce the consumption of the storage cloud service space using deduplication techniques.

Various embodiments provide methods for increased in-line deduplication efficiency in a computing environment. One method comprises incrementing the size of data samples from fixed size data chunks for each nth iteration for reaching a full size of an object requested for in-line deduplication, calculating in nth iterations hash values on data samples from fixed size data chunks extracted from the object, and matching in a nth hash index table the calculated nth iteration hash values for the data samples from the fixed size data chunks with a corresponding hash value of existing objects in storage, wherein the nth hash index table is built for each nth iteration of the data samples belonging to the fixed data chunks.

Various embodiments provide systems for increased in-line deduplication efficiency in a computing environment. One system comprises a processor device operable in a computing storage environment. In one embodiment, the processor is configured for incrementing the size of data samples from fixed size data chunks for each nth iteration for reaching a full size of an object requested for in-line deduplication, calculating in nth iterations hash values on data samples from fixed size data chunks extracted from the object, and matching in a nth hash index table the calculated nth iteration hash values for the data samples from the fixed size data chunks with a corresponding hash value of existing objects in storage, wherein the nth hash index table is built for each nth iteration of the data samples belonging to the fixed data chunks.

Also provided are physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product for increased in-line deduplication efficiency in a computing environment. One physical computer storage medium comprises computer code for incrementing the size of data samples from fixed size data chunks for each nth iteration for reaching a full size of an object requested for in-line deduplication, computer code for calculating in nth iterations hash values on data samples from fixed size data chunks extracted from the object, and computer code for matching in a nth hash index table the calculated nth iteration hash values for the data samples from the fixed size data chunks with a corresponding hash value of existing objects in storage, wherein the nth hash index table is built for each nth iteration of the data samples belonging to the fixed data chunks.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, with the emergence of storage cloud services, a new set of issues for storage cloud service providers are present in the area of data de-duplication, specifically when the storage cloud services providers want to reduce the consumption of their storage space using techniques such as deduplication. A storage cloud services provider may elect to use post process deduplication and/or in-line deduplication. With post-process deduplication, new data is first stored on the storage device and then a process, occurring at a later time, will analyze the data looking for duplication. The benefit is eliminating waiting for hash calculations and completing lookup operations in a hash table index before storing the data, thereby ensuring that storage performance is not degraded. In-line deduplication is the process where the deduplication hash calculations are created on the target device as the data enters the device in real time. If the device spots a block that the device already stored on the storage system, the device does not store the new block, but rather, simply makes a reference to the existing block. The benefit of in-line deduplication over post-process deduplication is that in-line deduplication requires less storage as data is not duplicated. On the other hand, because hash calculations and lookup operations in the hash table index experience significant time delays resulting in data ingestion being significantly slower, efficiency is decreased as the backup throughput of the device is reduced.

In the current state of the art, in-line deduplication techniques may be applicable over object stores. The hash of the entire object is calculated at run-time prior to determining if the object is eligible for deduplication and subsequent storing of the object. In general, this tends to impose performance penalties, especially on object store (NAS boxes enabled to store objects), which are integrated with deduplication technology. For example, it is a known fact that hashing is a computationally costly operation and highly memory intensive. If a particular workload have files/objects with very large footprints (e.g., files being in gigabytes (GB's), then by using the in-line deduplication techniques, as currently available in the art, hashing of entire objects impose a huge performance penalty.

In current systems for inline deduplication over objects, the technique of calculating the fingerprint (e.g., hash value) of the file received over Hypertext Transfer Protocol (HTTP) is to compare the calculated fingerprint for the entire object with the set of available fingerprints of the existing files on the storage system. However, buffering the complete file (which can be as large as several Gigabytes), calculating the hash value, and then using a hash-lookup table for comparison are memory extensive processes. Mainly, the hash calculation is an intensive operation and the time spent is quite significant for large objects (e.g., more than 10 seconds for objects of size greater than 10 GB). Hash calculation delays may vary depending upon the hash functions used. Such delays are simply unacceptable for communications over HTTP. These delays lead to bottlenecks impacting performance, and, in extreme cases, may result in denial-of-service (DoS) conditions on the web service.

Thus, a need exists for providing fast in-line deduplication capabilities at the application level. With the advancement of cloud storage services and access to the storage over HTTP, where thousands of HTTP requests per second are streaming in the data to the storage web service, providing deduplication support at the application (web service) level is extremely critical.

To address these inefficiencies, the mechanisms of the illustrated embodiment seek to provide increased in-line deduplication efficiency for an object store operation by intelligently curtailing the fingerprinting operation as early as possible. In one embodiment, the mechanisms begin buffering the object in the HTTP request, as opposed to waiting for the entire object to be received at the object store, and then executing the hash over the entire object. The mechanisms seek to improve in-line deduplication performance by significantly reducing the time spent in hash calculations for larger objects and determining the eligibility/possibility of deduplication of the object at an early stage, while the object is being transmitted over the wire to the object store. The mechanisms of the illustrated embodiments seek to minimize the utilization of the most important resources (e.g., time, CPU, and/or memory, etc.) used for in-line deduplication and reduce the latency experienced by the HTTP clients. An optimized method is proposed to more quickly determine the object which may be deduplicated and which objects may not be deduplicated by including a mechanisms whereby unique objects (e.g., objects which are new and are not currently in storage) are detected as early as possible and stored (e.g., on a disk) by doing a smart, granular, iterative process of extracting smaller chunks from the entire object.

In one embodiment, the mechanisms calculate, by a processor device in a computing environment, hash values in nth iterations on data samples from fixed size data chunks extracted from an object requested for in-line deduplication. (It should be noted that the data samples may be a predetermined fixed size.) The method further comprises, for each of the nth iterations, matching calculated hash values for the data samples from the fixed size data chunks in an nth hash index table with a corresponding hash value of existing objects in storage. The nth hash index table is built for each of the data samples from the fixed size data chunks. The nth hash index table is exited upon detecting a mismatch of the calculated hash values for one of the data samples from the fixed size data chunks during the matching. Upon detecting the mismatch, the mismatch is determined to be a unique object and the unique object is stored. The client is responded with status 'success' on creating an object in the object store. As a part of offline post processing, the hash value for the entire object is calculated. A master hash index table is updated with the calculated hash value(s) for the object and with the calculated hash values for the unique object. Also, in the offline processing, the nth index table is updated with the hash value at the nth iteration of the data samples from the fixed size data chunks of the new unique object.

In one embodiment, the hash values are calculated on fixed size data samples from fixed size data chunks, where the data samples are a predetermined fixed size (e.g., 1 kilobyte (KB) in size for the data sample) and the fixed sized data chunks are a predetermined fixed size (e.g., 1 megabyte (MB) in size for the data chunks). More particularly, the mechanisms calculate the hash values on the fixed size data samples that are the first fixed size data samples of the fixed size data chunks In other words, the mechanisms calculate the hash values on the fixed size data samples beginning with the fixed size data samples that are first in line (e.g., ordered first) in the fixed size data chucks. For example, the mechanisms process a chunk of a fixed size, such as 1 megabyte (MB) in each iteration, while picking up a sample of the first 1 kilobyte (KB) size data sample from each of the 1 megabyte (MB) chunks of data. The mechanisms may calculate a hash value of the fixed size sampled data and look for a match in a hash table corresponding to the on-going iteration. The mechanisms continue the foregoing processes until a match is found. The mechanisms may break the processing if a mismatch is found, and then, the mechanisms may insert the hash value in the hash table for the nth iteration (HTi). The mechanisms determine that the mismatch of sampled data indicates that the sampled data is a unique data object.

Figure 1:
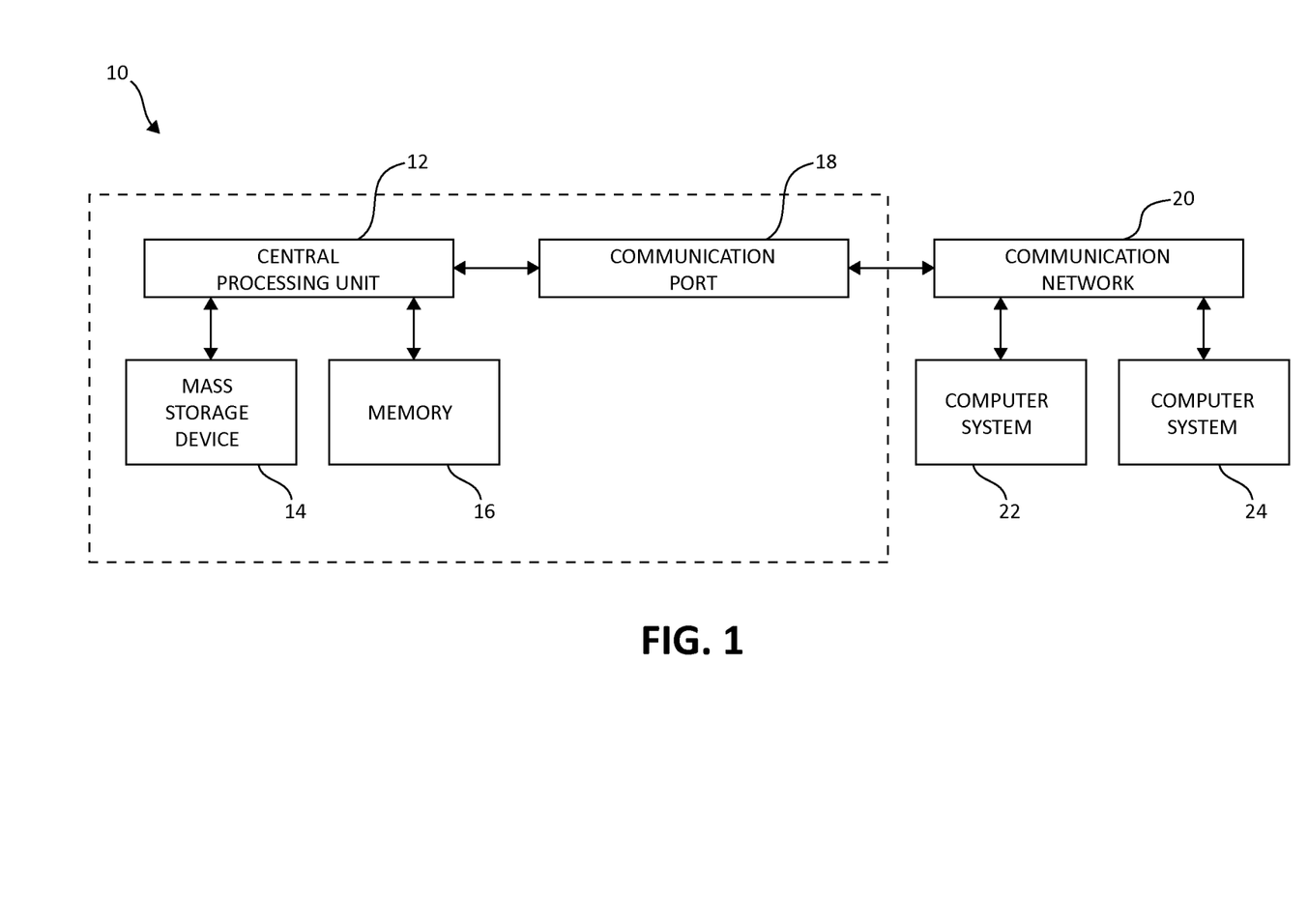
FIG. 1 is a block diagram illustrating a computer storage environment having an exemplary storage device in which aspects of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10.

Figure 2:
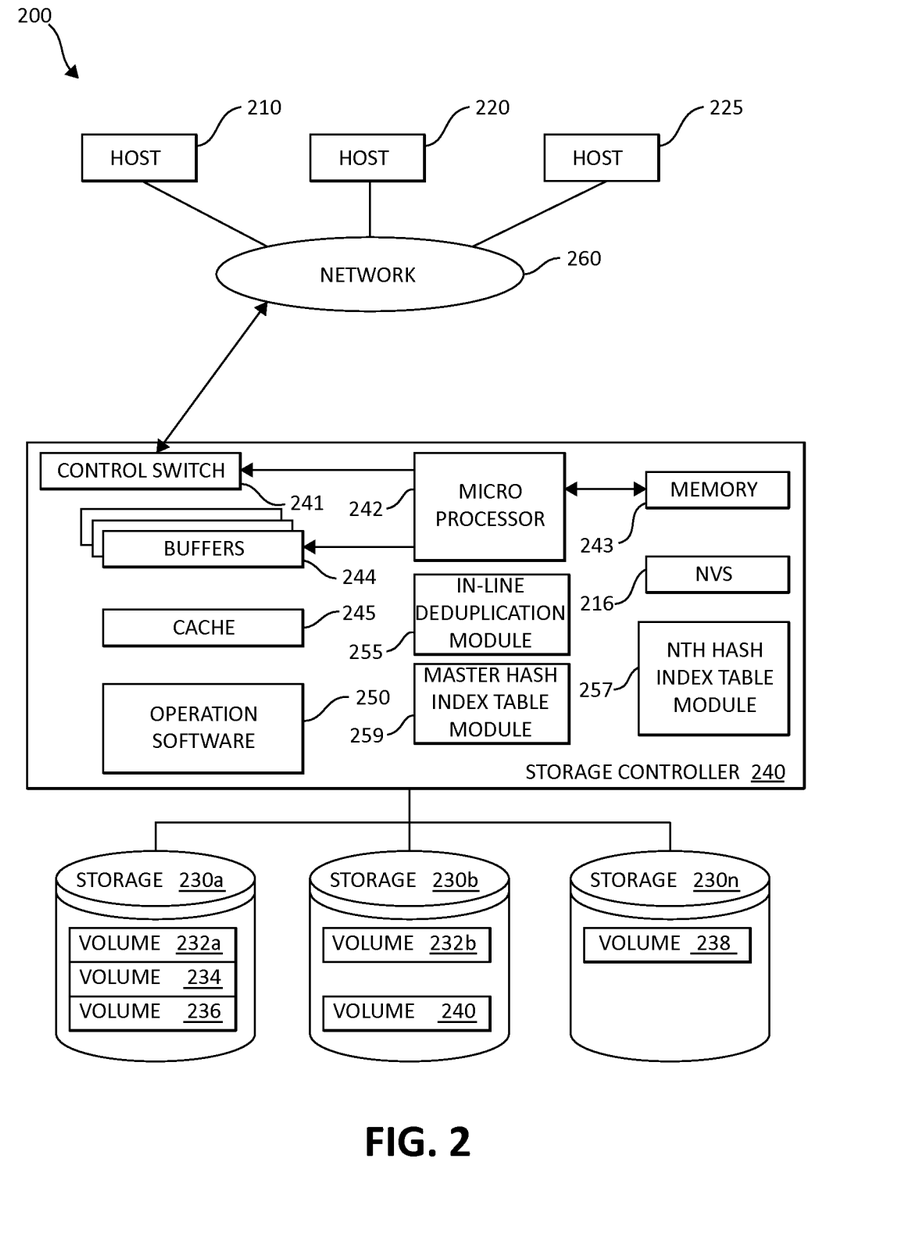
FIG. 2 is a block diagram illustrating a hardware structure of an exemplary data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A network (e.g., storage fabric) connection 260 may be a fibre channel fabric, a fibre channel point-to-point link, and a fibre channel over ethernet fabric or point-to-point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include an in-line deduplication module 255, nth Hash Index Table module 257, and Master Hash Index Table Module 259. The in-line deduplication module 255, nth Hash Index Table module 257, and Master Hash Index Table Module 259 may be one complete module functioning simultaneously or separate modules. The in-line deduplication module 255, nth Hash Index Table module 257, and Master Hash Index Table Module 259 may have some internal memory (not shown) in which the transition function algorithm may store unprocessed, processed, or "semi-processed" data. The in-line deduplication module 255, nth Hash Index Table module 257, and Master Hash Index Table Module 259 may work in conjunction with each and every component of the storage controller 240, the hosts 210, 220, 225, and other storage controllers 240 and hosts 210, 220, and 225 that may be remotely connected via the storage fabric 260. The in-line deduplication module 255, nth Hash Index Table module 257, and Master Hash Index Table Module 259 may be structurally one complete module or may be associated and/or included with other individual modules. The in-line deduplication module 255, nth Hash Index Table module 257, and Master Hash Index Table Module 259 may also be located in the cache 245 or other components of the storage controller 240. The nth Hash Index Table module 257 and Master Hash Index Table Module 259 may contain one or more hash index tables in each of the modules and may work in conjunction with other tables.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the processor assignment module 255 and the transition function module 257 in which information may be set. Multiple buffers 244 may be implemented to assist with the methods and steps as described herein.

In one embodiment, the cluster hosts/nodes, 210, 220, 225 and the storage controller 240 are connected through a network adaptor (this could be a fibre channel) 260 as an interface i.e., via a switch called "fabric." In one embodiment, the operation of the system shown in FIG. 2 may be described as follows. The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, processor assignment module 255, and transition function module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

The present invention may utilize the components of FIG. 1 and FIG. 2 for increased in-line deduplication efficiency, as well as other cloud storage systems (not shown) architectures commonly known in the art. In one embodiment, by way of example only, the mechanisms the components of FIG. 1 and FIG. 2 and/or other cloud storage systems architectures (not shown), perform the deduplication operation in 'nth' iterations. At each of the iterations, the mechanisms may increment the size of the data samples from the fixed size of the data chunks obtained from the file to be deduplicated. The iterations continue as the following describes. First, a read operation is performed on the first 'N1' bytes of the data samples, a hash value is computed on the data samples, and a lookup operation is performed in a hash-table labeled as "HT1" (or using similar mechanisms), which hash table is built with the hash value computed on the first 'N1' bytes of the files/objects already existing in the storage system. Next, if a match is found between the calculated hash value on the data sample of the fixed size data chunk and a hash value for an existing file/object already in storage, the mechanisms proceed collecting the data from the request for the entire object to be deduplicated. This collection and extraction of the data is performed for the next nth iterations until the mechanisms receive 'N2' bytes. Again, a lookup operation is performed into a hash-table (or using similar mechanisms) labeled as "HT2", which hash index table is built with the hash values computed on the first 'N2' bytes of the files/objects already existing in the storage system. The mechanisms continue repeating the processes, as stated above, reading N3, N4, N5 . . . Nnth bytes of the object and looking up into hash-tables HT3, HT4, HT5 . . . HTnth. It should be noted that the size of the nth bytes for the data chunks are fixed in size for each of the nth iterations for reaching the full size of the object. Patterns from historical data may be determined, by the mechanisms, for incrementing the size of the data samples based upon a deduplication ratio. If the deduplication ratio (e.g., deduplication objects/total objects) is high the nth iterations decrease and if the deduplication ratio is low the nth iterations increase.

Even if after performing the above described operations, if the mechanisms do not locate a mismatch in the lookup operation of the hash tables, and the object is exhausted (meaning the entire object has been successfully divided into smaller, fixed size data chunks), the mechanisms may still compute a hash value for the complete/full sized object and perform the lookup operation in a master hash-table. If the mechanisms detect a mismatch in the lookup operation of the master hash table, then the mechanism write the object to storage (e.g., onto a disk) and make an entry in the master hash table (hash table with the hash calculated of the full-sized files/objects).

If at any of the previously described steps, the mechanisms detect a mismatch in the lookup operation, the mechanisms may terminate the deduplication processing. The mismatch indicates that the object and/or the small, iterative, fixed size data chunks are unique (e.g., objects which are new and are not currently in storage). Upon termination of the deduplication, the mechanisms may store the object and/or the small, iterative, fixed size data chunks and send back a success response to the HTTP client. In an offline mode, the mechanisms compute the hash of the actual-full sized object and write the hash into an actual hash table, refereed to as a master hash-table. This process makes it possible for the mechanisms to stop the hash calculation at a very early stage when the object is determined to be unique. The number of hops to reach the max supported size of an object by the storage provider may be configurable, and the function used for the increments in the object sizes for each iteration may also be configured to tune the performance.

Figure 3:
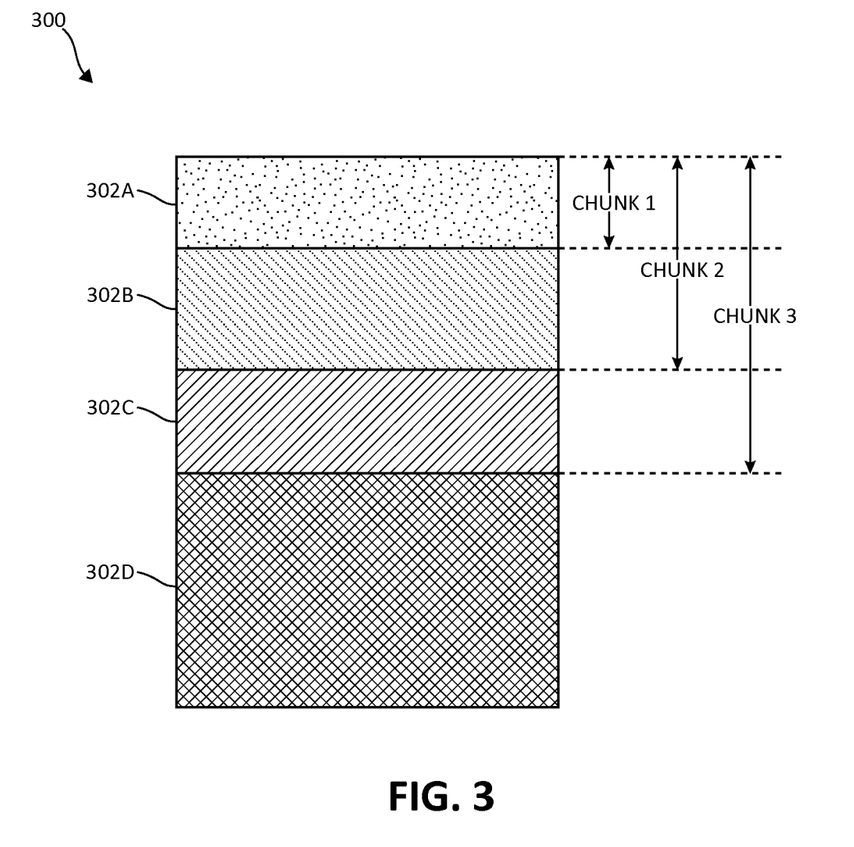
FIG. 3 is a flow chart diagram illustrating an exemplary method for increased in-line deduplication with data samples from the fixed size chunks.

FIG. 3, following, is a flow chart diagram illustrating an exemplary method 300 for increased in-line deduplication with data samples from the fixed size chunks. As previously described, the block diagram 300 illustrates computing the hash values for the fixed size data chunks 302 (shown in the diagram as chunk 1 labeled as 302A, chunk 2 labeled as 302B, chunk 3 labeled as 302C, and the bottom chunk labeled as 302D). These fixed size data chunks 302 represent the entire object/file requested for deduplication. For each iteration of the fixed size data chucks 302, a hash value is computed on a data sample (not shown) extracted from the data chunks 302. A corresponding hash index table for each iteration of the given chunk size is used to perform a lookup operation. A lookup operation is performed for matching the calculated hash value for each of the data samples of the fixed size data chunks with existing objects already in data storage. Upon detecting the first mismatch, the hash table is exited and the fixed size data chunks 302 are determined to be unique and stored (e.g., on a disk). A response is sent back to the HTTP client. Also, a hash value for the entire object (from which the iterative, fixed size data chunks 302 are extracted) is computed in an off-line mode and the master index table (HT-master) is updated. It should be noted that fixed size data chunks 302 may be predetermined by a user or from feedback illustrating historical patterns.

Figure 4:
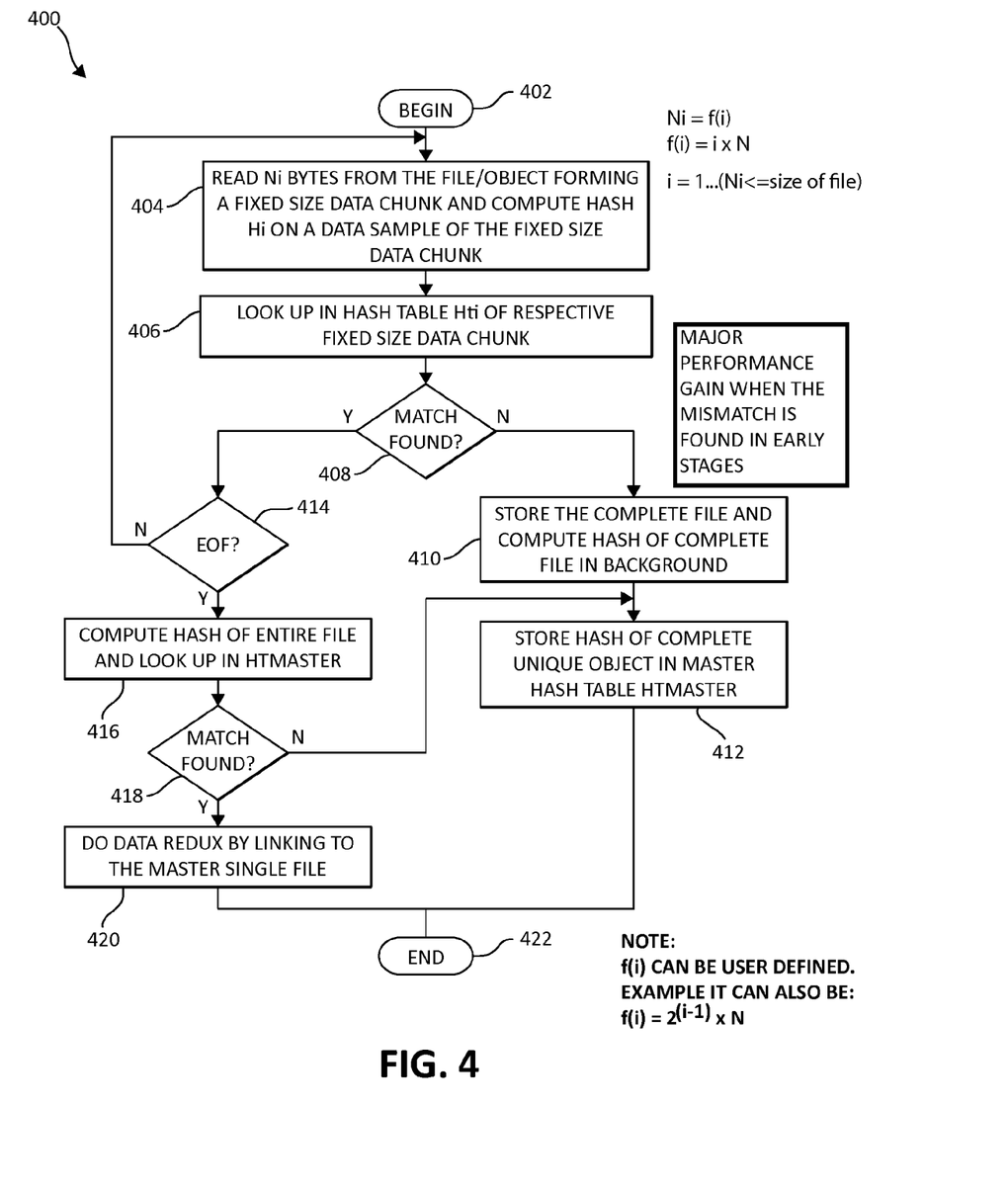
FIG. 4 is a flow chart illustrating an exemplary method for increased in-line deduplication efficiency.

FIG. 4, following, is a flow chart illustrating an exemplary method 400 for increased in-line deduplication efficiency. The method 400 begins (step 402). The method 400 reads "Ni" bytes from the object/file, forms, and data samples from fixed size data chunks and computes a hash value "Hi" on the data samples from the fixed size data chunks read from the file/object (step 404). It should be noted that these data samples are fixed in size and may be predetermined. The method 400 performs a lookup operation in a hash table "Ht-ith" of the respective data samples from fixed size data chunks (step 406). The method 400 determines if a match between the calculated hash value of the data samples from fixed size data chunks and a hash value for an existing file/object already in storage is found (step 408). If no match is found (e.g., a mismatch indicating that the small, iterative, data samples from fixed size data chunks are unique, which means the fixed size data chunks are new and are not currently in storage), the mechanisms store the complete object/file and/or fixed size data chunks, and compute a hash value for the complete and entire object/file in the background (e.g., in an offline mode) (step 410). The method 400 may then store the hash value of the complete unique object in the master hash table "HT-master" (step 412) and the method 400 may end (step 422).

Returning now to step 408, if a match is found, the method 400 determines if the end of the object/file has been reached (step 414). If no, the method 400 returns to step 404 and continues with reading "Ni" bytes from the object/file and forms data samples from fixed size data chunks and computes a hash value "Hi" on the chunk (step 404). If the end of the file is reached, the method 400 computes a hash value for the entire file and performs a look up operation in a master hash index table "HT-master" (step 416). The method 400 determines if a match between the calculated hash value for the entire/complete object/file and a hash value for an existing file/object already in storage if found (step 418). If a match is found, the method 400 may do a data reduction by linking to the master single file (step 420) and the method 400 may end (step 422).

However, if a match is not found (e.g., a mismatch indicates that the object and/or the small, iterative, data samples from fixed size data chunks are unique, e.g., objects which are new and are not currently in storage), the method 400 stores the hash value of the complete unique object in the master hash table "HT-master" (step 412) and the method 400 also ends (step 422).

Figure 5:
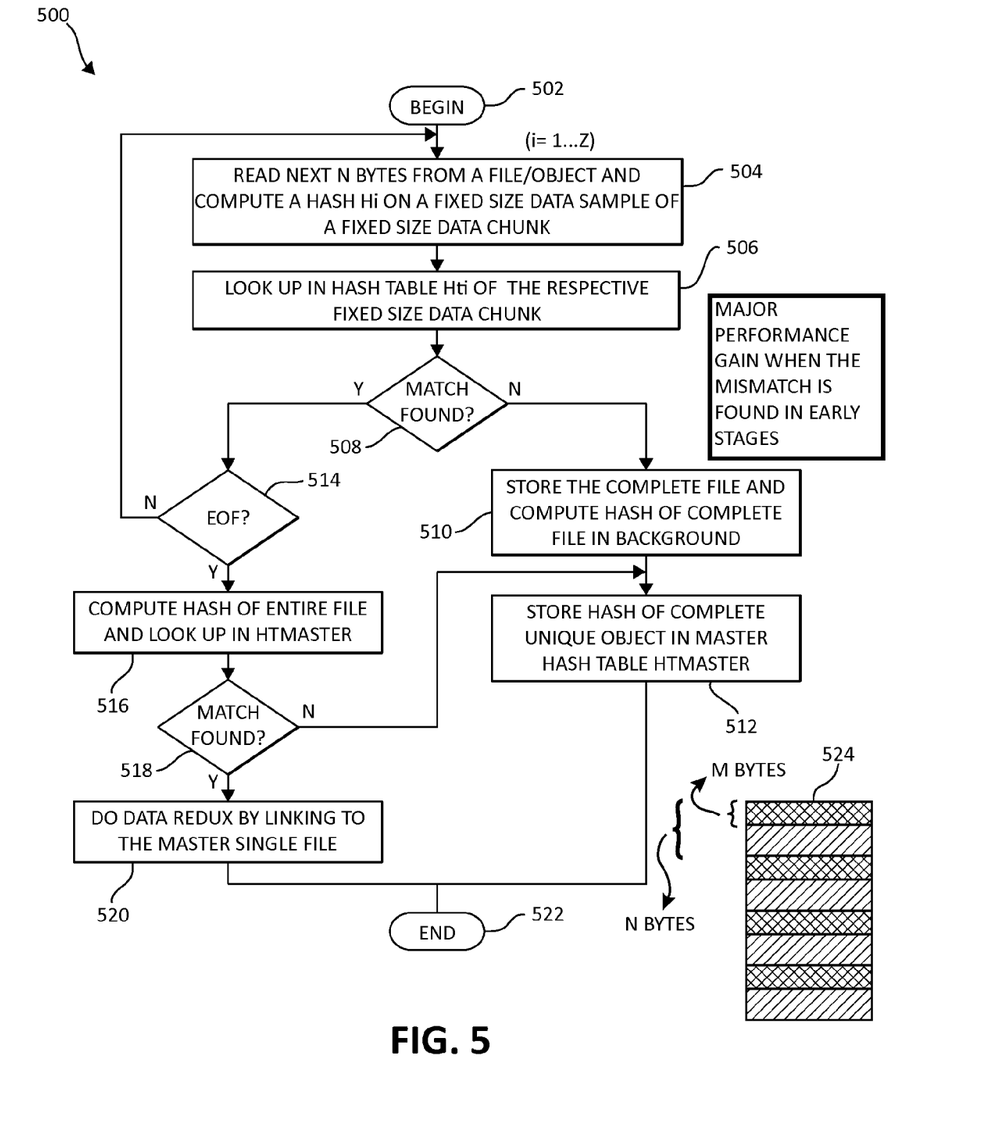
FIG. 5 is a flow chart illustrating an exemplary additional method for increased in-line deduplication efficiency.

FIG. 5 is a flow chart illustrating an exemplary additional method 500 for increased in-line deduplication efficiency. The method 500 begins (step 502). The method 500 reads "N" bytes (labeled as 524) from the object/file and computes a hash value "Hi" on a fixed sample chunk size of first M bytes (step 504) from the current chunk of size N under examination (M being smaller than N). For example, the hash value is calculated on 1 kilobytes (KB) fixed size data samples for every 10 MB size data chunks. The method 500 performs a lookup operation in a hash table "Ht-ith" of the respective data samples from fixed size data chunks (step 506). This process occurs for each iteration for the data samples from fixed size data chunks. The method 500 determines if a match between the calculated hash value for the data samples from fixed size data chunks and a hash value for an existing file/object already in storage is found (step 508). If no match is found (e.g., a mismatch indicating that the small, iterative, data samples from fixed size data chunks are unique, which means the fixed size data chunks are new and are not currently in storage), the method 500 stores the complete object/file and/or the fixed size data chunks, and computes a hash value for the complete and entire object/file in the background (e.g., in an offline mode) (step 510). Also, if no match is found, the method 500 exits the lookup operation at the first mismatch found. The method 500 may then store the hash value of the complete unique object in the master hash table "HT-master" (step 512) and the method 500 may end (step 522).

If a match is found, the method 500 determines if the end of the object/file has been reached (step 514). If a matching hash value is found for the given data samples from fixed size data chunks, the method 500 ensures that the hash value from the hash index table is logically and sequentially related to the same file as that of the previous hash value that was found. If no, the method 500 returns to step 504 and continues with reading "N" bytes from the object/file and computes a hash value "Hi" on a chunk sized of M bytes (step 504). If the end of the file is reached, the method 500 computes a hash value for the entire file and performs a lookup operation in a master hash index table "HT-master" (step 516). The method 500 determines if a match between the calculated hash value for the entire, complete object/file and a hash value for an existing file/object already in storage (step 518) is found. If a match is found, the method 500 may do a data reduction by linking to the master single file (step 520) and the method 500 may end (step 522). It should be noted that if all of the hash values are found to be matching for each of the data samples from the fixed size data chunks, the object/file is deduplicated. Also, a response may be sent back to the user at anytime indicated a match and/or mismatch.

However, if a match is not found (e.g., a mismatch indicates that the object and/or the small, iterative, fixed data chunks are unique, e.g., objects which are new and are not currently in storage), the method 500 stores the hash value of the complete unique object in the master hash table "HT-master" (step 512) and the method 500 also ends (step 522).

By way of example only, consider the following scenario. Consider for example, if the complete file size is 1100240234 bytes (e.g., greater than 1 GB). 1) The mechanisms will collect only the first N1=1000 bytes (forming a smaller chunk) and then compute a hash value on a data sample for the small, fixed size data chunk N1. A lookup operation is performed in the hash-table H1000, which is filled with fingerprints (hash values) of the first 1000 bytes of the existing objects in storage. If the mechanisms detect a mismatch between the calculated hash values for the small chunk, the mechanisms place an entry in the hash-table H1000 with a new fingerprint (hash value) and proceed with processing. 2) In the $2^{nd}$ iterative step, the mechanisms collect N2=10000 (N1*10) bytes, and then compute a hash value on a data sample for the fixed size data chunk N2. Again, a lookup operation is performed by matching the calculated hash value for the smaller chunk N2 with fingerprints (hash values) of the first 1000 bytes of the existing objects in storage that are filled in the hash table H10000 as described above. 3). The mechanisms continue the above steps with N3=100000 (N2*10), N4=1000000 (N3*10), etc., until the lookup operations detect a match and/or a mismatch.

In an additional example, assume the complete file size is 1100240234 bytes (e.g., greater than 1 GB). 1) The mechanisms may collect only the first N1 bytes forming a data sample N1 (e.g., N1=1000 bytes) of a predetermined, fixed size data chunk M1 (e.g., M1=1 MB) and then compute a hash value on the data sample N1 for the fixed size data chunk M1. A lookup operation is performed in the hash-table H1000, which is filled with fingerprints (hash values) of the first H bytes (e.g., H=1000 bytes) of the existing objects in storage. If the mechanisms detect a mismatch between the calculated hash values on the data samples N1 for the fixed size data chunk M1, the mechanisms place an entry in the hash-table H1000 with the new fingerprint (hash value) and proceed with processing. 2) In the $2^{nd}$ iterative step, the mechanisms collect the first N2 bytes (e.g., N2=1000 bytes) forming a data sample N2 on a second fixed size data chunk M2 (e.g., M2=1 MB), and then compute a hash value on the data sample N2 for the second fixed size data chunk M2. Again, a look up operation is performed by matching the calculated hash value of the data sample N2 for the second fixed size data chunk M3 with fingerprints (hash values) of the first H bytes (e.g., 1000 bytes) of the existing objects in storage that are filled in the hash table H1000 as described above. 3). The mechanisms continue the above steps for n iterations on M number of fixed sized data chunks until the lookup operations detect a match and/or a mismatch.

In another example, the mechanisms can process a chunk of a fixed size, such as 1 megabyte (MB) in each iteration, while picking up a fixed size data sample (e.g., the first 1 kilobyte (KB)) size from each of the fixed (e.g., 1 megabyte (MB)) chunk of data. The mechanisms may calculate a hash value of the fixed size sampled data and look for a match in a hash table corresponding to the on-going iteration. The mechanisms continue this process until a match is found. The mechanisms will break if a mismatch is found and insert the hash value in the hash table for the nth iteration (HTi). The mechanisms determine that the mismatch of sampled data indicates that the sampled data is a unique data object.

In an alternative embodiment, by way of example only, the fixed data chunk size under examination in each iteration can be increased logarithmically; for example 1 MB, 2 MB, 4 MB, 8 MB, 16 MB, . . . nth MB, and at each iteration, the first N bytes (e.g., 1K bytes) size of data forming a data sample is picked up and hashed to find a match in the corresponding hash-table at that iteration. The fixed data samples remain the same predetermined size for each fixed size data chunk for each iteration. The mechanisms may cease the deduplication operation once either a match is found or the data object under examination is exhausted. In the alternative, the mechanism may continue inserting the hash calculated at each iteration in the corresponding hash-table ('HTi' at iteration number Nth).

It should be noted that the mechanisms of the illustrated embodiments provide for an adaptive in-line deduplication operation. The mechanisms may be self-adapting by learning from the pattern the mechanisms draw and observe from recent past observations. In other words, if the deduplication ratio (deduplication objects/total objects) is high, fewer hops can be taken to reach the full size of the object, whereas if the deduplication ratio decreases, the number of hops can be increased. In an extreme case, only the first N (e.g., 1000) bytes may be checked and if a match is found, calculate the hash of the complete object else treat that object as a unique object. Thus, the type of mechanisms (e.g., algorithm) to use can be flexible and can be adapted as per the pattern of objects being stored in a storage system.

Thus, by the mechanisms described above, faster, adaptive in-line deduplication is obtained by analyzing recent history of received objects. Smaller hops occur when a deduplication ratio (i.e., deduplication objects/total objects examined) is low (e.g., when more unique objects are found because the number of deduplication objects are less than total objects found) and larger hops occur when the deduplication ratio is high (e.g., when less unique objects are found because the number of deduplication objects are more than total objects found). A predetermined deduplication threshold may be used to establish a minimum/maximum amount and/or for comparing, evaluating, and determining the ratio. The deduplication ratio assists in reducing the number of lookup operations required for deduplication of objects and increases the chances for determining which objects are unique in a quick and more accelerated fashion. This allows for avoiding unnecessary computation of hash values for the complete object at the run-time for unique objects. In one embodiment, the mechanisms may adapt itself with patterns of objects it observes and determines from acquired feedback, thereby taking larger hops when the deduplication ratio (deduplication objects/total objects) is high (e.g., when the deduplication ratio is higher than a predetermined threshold, the nth iterations decrease) and smaller hops when the deduplication ratio is low (e.g., when the deduplication ratio is lower than a predetermined threshold, the nth iterations increase). In other words, the nth iterations may decrease as the deduplication ratio increases and the nth iterations may increase as the deduplication ratio decreases. This assists in minimizing run-time computations required for deduplication and reducing the response latency making the deduplication engine/module perform faster.

As described above, various embodiments provide methods, systems, and computer program products for increased in-line deduplication efficiency in a computing environment. The mechanisms of the embodiments calculate, by a processor device in a computing environment, hash values in nth iterations for fixed data chunks extracted from an object requested for in-line deduplication. The embodiments further comprise, for each of the nth iterations, matching the calculated hash values for the fixed data chunks in a nth hash index table with a corresponding hash value of existing objects in storage. The nth hash index table is built for each of the fixed data chunks. The nth hash index table is exited upon detecting a mismatch of the calculated hash values for one of the fixed data chunks during the matching. The mismatch is determined to be a unique object and is stored. The client is responded with status 'success' on creating an object in the object store. As a part of offline post processing, the hash value for the entire object is calculated. A master hash index table is updated with the calculated hash value for the object and the calculated hash values for the unique object. Also, in the offline processing, the nth index table is updated with the hash value at the nth iteration of the fixed data chunks of the new unique object.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for increasing in-line deduplication efficiency by a processor device, the method comprising:
   incrementing the size of data samples from fixed size data chunks for each nth iteration for reaching a full size of an object requested for in-line deduplication;
   calculating in nth iterations hash values on data samples from fixed size data chunks extracted from the object;
   matching in a nth hash index table the calculated nth iteration hash values for the data samples from the fixed size data chunks with a corresponding hash value of existing objects in storage, wherein the nth hash index table is built for each nth iteration of the data samples belonging to the fixed data chunks;
   determining whether an end of the object has been reached;
   if the end of the object has not been reached, calculating in another nth iteration hash values on the data samples from the fixed size data chunks; and
   matching in another nth hash index table the calculated other nth iteration hash values for data samples from the fixed size data chunks with a corresponding hash value of existing objects in storage, wherein the other nth hash index table is built for each other nth iteration of the data samples belong to the fixed data chunks.

2. The method of claim 1, further comprising:
   detecting a mismatch of the calculated nth iteration hash values during the matching; and
   exiting the nth hash index table.

3. The method of claim 2, further comprising:
   adding the mismatched calculated nth iteration hash values to the nth hash index table.

4. The method of claim 1, further comprising:
   upon completing the incrementing of the data samples from the fixed size data chunks in the object and the matching, calculating a hash value for the object, wherein a master hash index table is updated with the calculated hash value for the object and the calculated hash values for the unique object and performing the matching in a master hash index table for the calculated hash value of the object.

5. The method of claim 1, further comprising:
   determining a plurality of patterns from historical data for the incrementing based upon a deduplication ratio, wherein the nth iterations decrease as the deduplication ratio increases and the nth iterations increase as the deduplication ratio decreases.

6. A system for increased in-line deduplication efficiency in a computing environment, the system comprising:
   a processor device operable in the computing environment, wherein the processor device is adapted for:
   incrementing the size of data samples from fixed size data chunks for each nth iteration for reaching a full size of an object requested for in-line deduplication;
   calculating in nth iterations hash values on data samples from fixed size data chunks extracted from the object;
   matching in a nth hash index table the calculated nth iteration hash values for the data samples from the fixed size data chunks with a corresponding hash value of existing objects in storage, wherein the nth hash index table is built for each nth iteration of the data samples belonging to the fixed data chunks;
   determining whether an end of the object has been reached;
   if the end of the object has not been reached, calculating in another nth iteration hash values on the data samples from the fixed size data chunks; and
   matching in another nth hash index table the calculated other nth iteration hash values for data samples from the fixed size data chunks with a corresponding hash value of existing objects in storage, wherein the other nth hash index table is built for each other nth iteration of the data samples belongin to the fixed data chunks.

7. The system of claim 6, wherein the processor device is further adapted for:
   detecting a mismatch of the calculated nth iteration hash values during the matching; and
   exiting the nth hash index table.

8. The system of claim 7, wherein the processor device is further adapted for:
   adding the mismatched calculated nth iteration hash values to the nth hash index table.

9. The system of claim 6, wherein the processor device is further adapted for:
   upon completing the incrementing of the data samples from the fixed size data chunks in the object and the matching, calculating a hash value for the object, wherein a master hash index table is updated with the calculated hash value for the object and the calculated hash values for the unique object and performing the matching in a master hash index table for the calculated hash value of the object.

10. The system of claim 6, wherein the processor device is further adapted for:
   determining a plurality of patterns from historical data for the incrementing based upon a deduplication ratio, wherein the nth iterations decrease as the deduplication ratio increases and the nth iterations increase as the deduplication ratio decreases.

11. A computer program product for increased in-line deduplication efficiency in a computing environment by a processor device, the computer program product comprising a computer-readable storage medium having computer-readable program code portions stored therein, the computer-readable program code portions comprising:
   computer code for incrementing the size of data samples from fixed size data chunks for each nth iteration for reaching a full size of an object requested for in-line deduplication;
   computer code for calculating in nth iterations hash values on data samples from fixed size data chunks extracted from the object;
   computer code for matching in a nth hash index table the calculated nth iteration hash values for the data samples from the fixed size data chunks with a corresponding hash value of existing objects in storage, wherein the nth hash index table is built for each nth iteration of the data samples belonging to the fixed data chunks;
   computer code for determinin whether an end of the object has been reached;
   computer code for if the end of the obect has not been reached calculating in another nth iteration hash values on the data samples from the fixed size data chunks; and
   computer code for matching in another nth hash index table the calculated other nth iteration hash values for data sam les from the fixed size data chunks with a corresponding hash value of existing objects in storage, wherein the other nth hash index table is built for each other nth iteration of the data samples belonging to the fixed data chunks.

12. The computer program product of claim 11, further including:
   computer code for detecting a mismatch of the calculated nth iteration hash values during the matching; and
   computer code for exiting the nth hash index table.

13. The computer program product of claim 12, further including:
   computer code for adding the mismatched calculated nth iteration hash values to the nth hash index table.

14. The computer program product of claim 11, further including:
   computer code for, upon completing the incrementing of the data samples from the fixed size data chunks in the object and the matching, calculating a hash value for the object, wherein a master hash index table is updated with the calculated hash value for the object and the calculated hash values for the unique object and performing the matching in a master hash index table for the calculated hash value of the object.

15. The computer program product of claim 11, further including:
   computer code for determining a plurality of patterns from historical data for the incrementing based upon a deduplication ratio, wherein the nth iterations decrease as the deduplication ratio increases and the nth iterations increase as the deduplication ratio decreases.

* * * * *